United States Patent
Holcombe et al.

(10) Patent No.: US 8,331,747 B1
(45) Date of Patent: Dec. 11, 2012

(54) NON-CONDUCTIVE FIBER OPTIC MEMBER

(75) Inventors: Charles L. Holcombe, Newnan, GA (US); Stephen L. Spruell, Carrollton, GA (US); Mark Lancaster, Brooks, GA (US)

(73) Assignee: Southwire Company, Carrollton, GA (US)

( * ) Notice: Subject to any disclaimer, the term of this patent is extended or adjusted under 35 U.S.C. 154(b) by 213 days.

(21) Appl. No.: 12/612,827

(22) Filed: Nov. 5, 2009

Related U.S. Application Data

(60) Provisional application No. 61/112,326, filed on Nov. 7, 2008.

(51) Int. Cl.
*G02B 6/00* (2006.01)
*G02B 6/44* (2006.01)

(52) U.S. Cl. ............. 385/102; 385/12; 385/13; 385/101

(58) Field of Classification Search ............... 385/12, 385/13, 101, 102
See application file for complete search history.

(56) References Cited

U.S. PATENT DOCUMENTS

| | | | | |
|---|---|---|---|---|
| 4,603,942 | A * | 8/1986 | Chang et al. .................. | 385/100 |
| 7,769,260 | B2 * | 8/2010 | Hansen et al. ................ | 385/100 |
| 2004/0109651 | A1 * | 6/2004 | Lancaster et al. ............ | 385/101 |

OTHER PUBLICATIONS

Gary Schmidt et al., "Advances in Fiber Optic Distributed Temperature Sensing for Underground Transmission Cables," SPEC SensorTran Division ComEd, Nov. 1999, 7 pgs.
G.P. Van Der Wijk et al., "An Intelligent HV Power Cable System," CIGRE 1996: 15/21/33-11, 6 pgs., publication unknown.
Cable Design—partial article, pp. 2-10, author, publication, & date unknown.
O. Nigol et al., "Characteristics of ACSR Conductors at High Temperatures and Stresses," IEEE Transactions on Power Apparatus and Systems, vol. PAS-100, No. 2, Feb. 1981, pp. 485-493.
"ComEd: Energized for the Future," Commonwealth Edison pamphlet, 10 pgs., date unknown.
Gene Sanders, "FO Conductor: Temp Sensing," Problem Solving Report Question No. 1058607.002, Jan. 19, 2000, pp. 1-18.
K.T. Yoon, "Controlling and Monitoring Singapore's Underground Grid," PowerGrid Ltd., Singapore, ISSN 0895-0156, Oct. 1999, pp. 23-29.
Todd Hudson, "Fine-tuned for cable TV Introducing an optical power meter ideally suited for analog measurements," Communications Test Equipment, Siemens Industrial Automation, Products, 1 pg., date unknown.
"Guide for Partial-Discharge Test Procedure," Publication T-24-380, Revised Dec. 1980, Insulated Cable Engineers Association, Inc., 6 pgs., author unknown.
Jay A. Williams et al., "Increasing Cable Rating by Distributed Fiber Optic Temperature Monitoring and Ampacity Analysis," Transmission and Distribution Conference, IEEE vol. 1, Apr. 1999, 7 pgs.
D.A. Douglass, "Radial and Axial Temperature Gradients in Bare Stranded Conductor," IEEE Power Engineering Review, Apr. 1986, PER 6/Issue 4, pp. 1-7.
J.F. Minambres et al., "Radial Temperature Distribution in ACSR Conductors Applying Finite Elements," Power Delivery, IEEE Transactions on vol. 14, Issue 2, Apr. 1999, pp. 473-480.
Stephen D. Foss et al., "Significance of the Conductor Radial Temperature Gradient within a Dynamic Line Rating Methodology," IEEE Power Delivery, vol. 2, Issue 2, 1986, 7 pgs.

(Continued)

*Primary Examiner* — Jerry Blevins
(74) *Attorney, Agent, or Firm* — Merchant & Gould

(57) ABSTRACT

An electrical cable may be provided. The electrical cable may comprise a conductor and a fiber optic member. The fiber optic member may comprise an optical fiber and a sheath surrounding the optical fiber. The sheath may be configured to not damage the optical fiber when the electrical cable is bent.

17 Claims, 2 Drawing Sheets

OTHER PUBLICATIONS

Tom Rodenbaugh et al., "Temperature sensors maximize underground cable power transfer," Electric Light & Power, Dec. 1, 1998, Technology, 2 pgs.

Ichiro Matsubara et al., "Total Monitoring System for the Reihoku Thermal Power Transmission Line of the Kyushu Electric Power Company," 7 pgs, publication & date unknown.

AEIC CS5-94, Specifications for Cross-Linked Polyethylene Insulated Shielded Power Cables Rated 5 Through 46 Kv, $10^{th}$ Edition, Association of Edison Illuminating Companies, Mar. 1, 1994, author unknown, pp. 24, 25, 33, & 34.

Alfred Roller et al., "Fortified with Fiber Optics," Siemens Telecommunication Cables, Neustadt, Technology, 3 pgs., date unknown.

* cited by examiner

NON-CONDUCTIVE FIBER OPTIC MEMBER

RELATED APPLICATION

Under provisions of 35 U.S.C. §119(e), Applicant claims the benefit of U.S. provisional application No. 61/112,326, filed Nov. 7, 2008, which is incorporated herein by reference.

COPYRIGHTS

All rights, including copyrights, in the material included herein are vested in and the property of the Applicants. The Applicants retain and reserve all rights in the material included herein, and grant permission to reproduce the material only in connection with reproduction of the granted patent and for no other purpose.

BACKGROUND

Electrical cables may be used to carry power out of an electrical power substation. The more power transmitted from the electrical power substation by the electrical cables, the hotter the electrical cables become. Because there is a safe temperature limit for the electrical cables, operators of the electrical power substation desire to know the temperature of the electrical cables used to carry power out of the electrical power substation.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

An electrical cable may be provided. The electrical cable may comprise a conductor and a fiber optic member. The fiber optic member may comprise an optical fiber and a sheath surrounding the optical fiber. The sheath may be configured to not damage the optical fiber when the electrical cable is bent.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
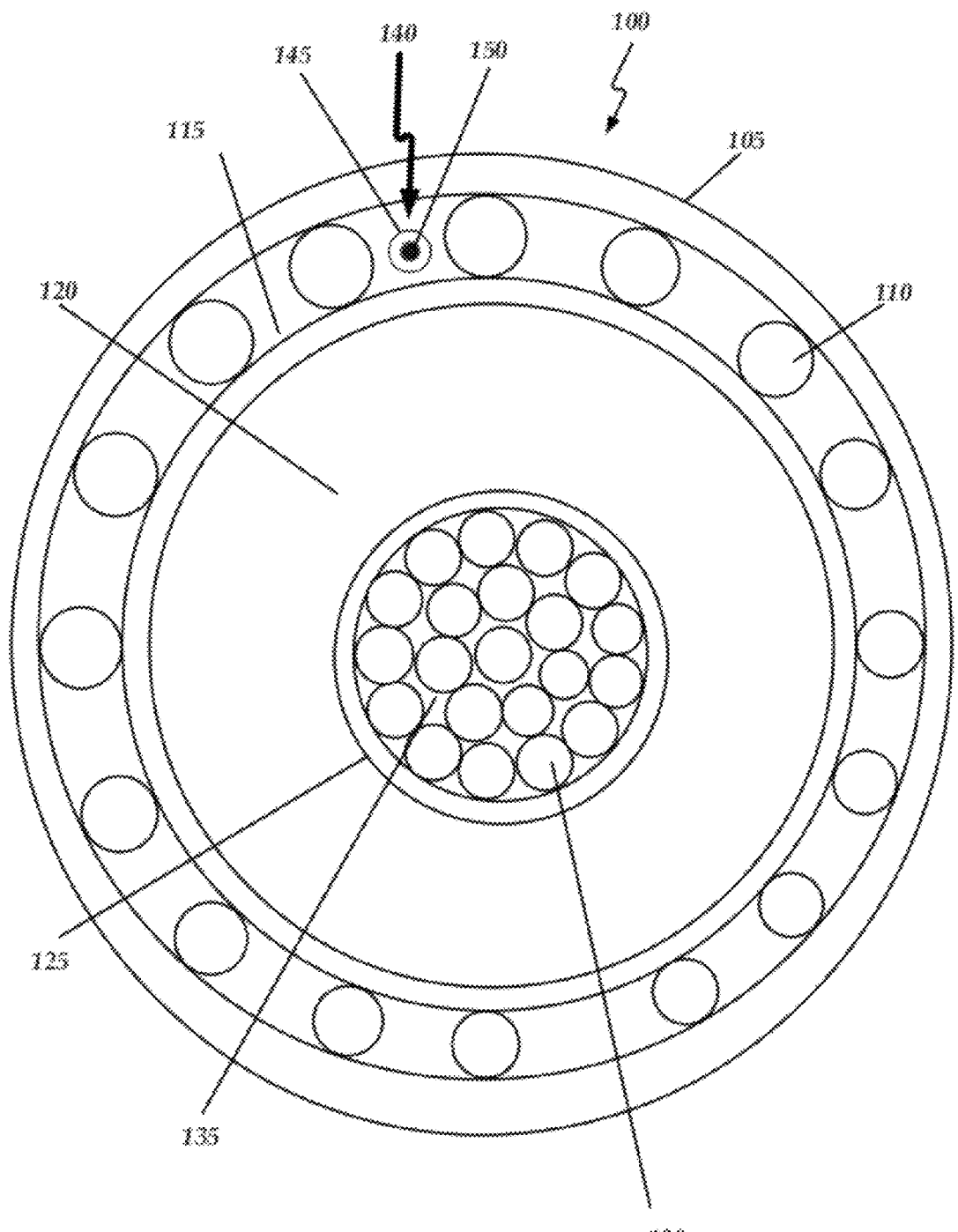
FIG. 1 shows an electrical cable.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Using optical fibers in energy cables may provide useful benefits. For example, these useful benefits may include transmitting data or using optical fibers for sensing temperature along an energy cable's conductor (e.g. a stranded conductor 130 as described below) using a distributed temperature sensing (DTS) method. The DTS method may use optoelectronic devices that measure temperatures using optical fibers functioning as linear sensors. Temperatures may be recorded along the optical fiber, thus not at points, but as a continuous profile. Consequently, temperatures along an energy cable's conductor may be recorded along the optical fiber as a continuous profile. A high accuracy of temperature determination may be achieved over great distances using DTS. DTS may use the Raman-effect to measure temperatures using the optical fiber as a linear sensor. The aforementioned optoelectronic devices may include computers to implement the DTS method and display devices configured to display the continuous temperature profile.

Figure 3:
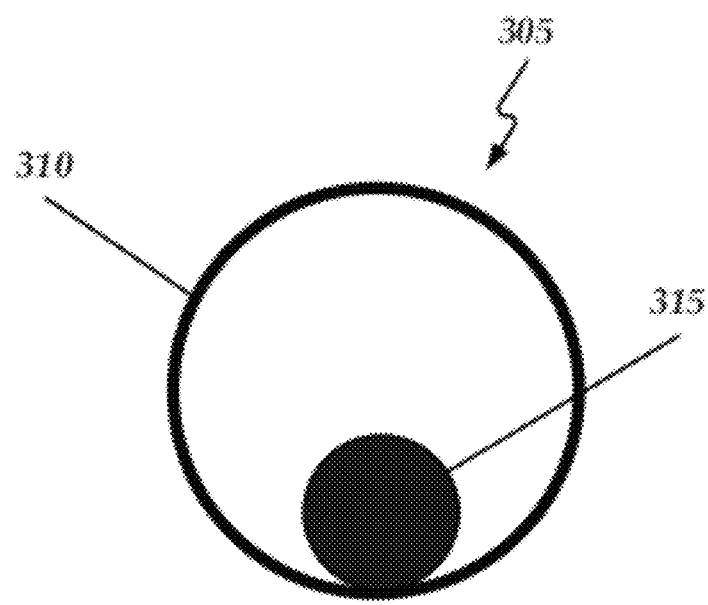
FIG. 3 shows a prior art tube.

FIG. 3 shows a prior art stainless steel tube configuration 305. Conventional systems have an optical fiber 315 placed in a stainless steel tube 310 to protect optical fiber 315 from damage. Conventional systems are problematic because stainless steel tube 310 "kinks" easily when bent, which damages optical fiber 315 within stainless steel tube 310. For example, when stainless steel tube 310 is bent, stainless steel tube 310 will kink, thus causing kinked stainless steel tube 310 to pinch optical fiber 315. After being pinched by stainless steel tube 310, optical fiber 315 may be so damaged that it can no longer be useful for transmitting data or sensing temperature. Conventional stainless steel tube 310 may be bent (and subsequently kinked) when a conventional electrical cable including conventional stainless steel tube 310 is bent during installation of the conventional electrical cable.

Moreover, stainless steel tube 310 is conductive, which is also problematic because a voltage may be present on stainless steel tube 310. For example, having a voltage present on stainless steel tube 310 may be dangerous when splicing optical fiber 315 in stainless steel tube 310. Furthermore, stainless steel tubes are tedious to remove during splicing operations. This is because a great deal of force may be needed to cut stainless tubes during splicing operations.

FIG. 1 shows an electrical cable 100 consistent with embodiments of the present invention. As shown in FIG. 1, electrical cable 100 may comprise a jacket 105, a concentric neutral 110, an insulation shield 115, insulation 120, a conductor shield 125, stranded conductor 130, and a strand seal 135. Jacket 105 may provide thermal, mechanical, and environmental protection to the layers subsequently contained in electrical cable 100. Jacket 105 may comprise, but is not limited to, polyethylene, PVC, or nylon. Jacket 105, insulation shield 115, and conductor shield 125 may control electrical stress by providing for more symmetry of the dielectric fields within electrical cable 100.

Concentric neutral 110 may comprise a plurality of electrically conductive strands (e.g. comprising copper or aluminum) placed concentrically around insulation shield 115. As alternatives to concentric neutral 110, a shield comprising a circumferentially corrugated metal tape, a helically applied copper tape that may be corrugated, or a helically applied flat copper straps evenly spaced about electrical cable 100's center may be used. Concentric neutral 110 may serve as a neutral return current path for electrical cable 100. Insulation shield 115 may comprise an extruded semi-conducting layer that may be partially bonded to insulation 120.

Insulation 120 may comprise an extruded layer that may provide electrical insulation between stranded conductor 130 and an electrical ground. Insulation 120 may prevent an electrical fault. Moreover, insulation 120 may comprise, for example, polyethylene, cross-linked polyethylene, or ethylene-propylene rubber. Conductor shield 125 may comprise a semi-conducting material that may surround stranded conductor 130.

Having stranded conductor 130 may add flexibility to electrical cable 100. Small spaces between stranded conductor 130's strands may provide a path for water to ingress electrical cable 100. This water ingression may aggravate a problem known as "water treeing" that may accelerate electrical cable 100's failure due to electrical breakdown. In an attempt to mitigate this water treeing issue, strand seal 135 may be added into spaces between stranded conductor 130's strands. While strand seal 135 may limit water ingress, it may also add to electrical cable 100's stiffness. A solid conductor configuration in the place of stranded conductor 130 may not requiring strand seal 135, but may also add to electrical cable 100's stiffness.

Figure 2:
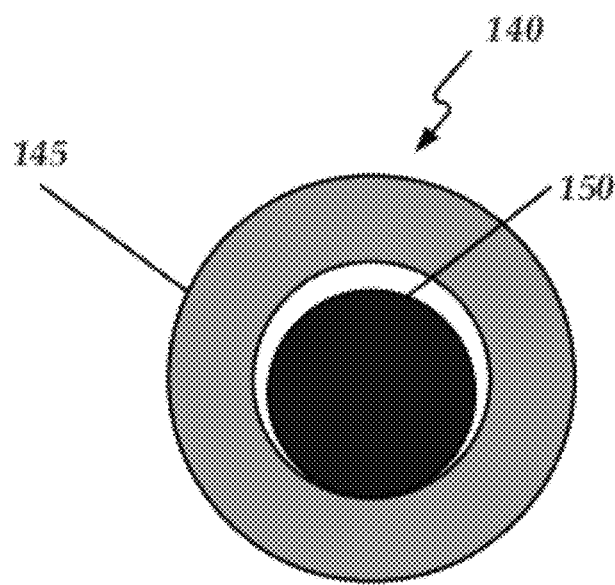
FIG. 2 shows a non-conductive fiber optic member.

Consistent with embodiments of the invention, a non-conductive fiber optic member may be provided. FIG. 1 and FIG. 2 show a non-conductive fiber optic member 140 that may be used in conjunction with electrical cable 100 of FIG. 1 consistent with embodiments of the present invention. Non-conductive fiber optic member 140 may comprise a non-conductive sheath 145 and an optical fiber 150. Non-conductive sheath 145 may comprise fiberglass or any other suitable non-conductive material. Non-conductive sheath 145 may contain one or more optical fibers similar to optical fiber 150.

Non-conductive fiber optic member 140 may be placed in electrical cable 100 as shown in FIG. 1. While fiber optic member 140 is shown in FIG. 1 to be placed between strands of concentric neutral 110, non-conductive fiber optic member 140 may be placed anywhere within electrical cable 100. Non-conductive fiber optic member 140 may be placed between strands of concentric neutral 110 to provided added protection of non-conductive fiber optic member 140. For example, because strands of concentric neutral 110 may be larger in diameter than non-conductive fiber optic member 140, placing non-conductive fiber optic member 140 between strands of concentric neutral 110 may create a place within electrical cable 100 that may protect non-conductive fiber optic member 140 from physical stresses placed upon electrical cable 100 when electrical cable 100 is manufactured, processed, shipped, transported, handled, installed, or otherwise used.

As stated above, non-conductive sheath 145 may comprise fiberglass or any other suitable non-conductive material. Consequently, non-conductive sheath 145 may not kink easily when electrical cable 100 is bent, thus avoiding damage to optical fiber 150 within non-conductive sheath 145. For example, when electrical cable 100 containing non-conductive fiber optic member 140 is bent, non-conductive sheath 145 may not kink, thus avoiding any damage to optical fiber 150 by non-conductive sheath 145. Even after electrical cable 100 is bent, optical fiber 150 may still be useful for transmitting data or sensing temperature, for example.

Moreover, non-conductive sheath 145 may be non-conductive, which may avoid a voltage on non-conductive sheath 145. For example, not having a voltage present on non-conductive sheath 145 may be desirable when splicing optical fiber 150 in non-conductive sheath 145. Furthermore, non-conductive sheaths (e.g. fiberglass) may be more easily removed during cable splicing operations than stainless steel tubes.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. An electrical cable comprising:
   a conductor;
   a fiber optic member comprising,
      an optical fiber, and
      a sheath surrounding the optical fiber, the sheath being configured to not damage the optical fiber when the electrical cable is bent;
   a concentric neutral comprising a plurality of electrically conductive strands, each of the plurality of electrically conductive strands being substantially evenly placed concentrically around the conductor, the fiber optic member being place between two of the plurality of electrically conductive strands wherein the two of the plurality of electrically conductive strands each have a diameter greater than a diameter of the fiber optic member; and
   a jacket around the concentric neutral defining a space between the jacket and the two of the plurality of electrically conductive strands configured to protect fiber optic member from physical stresses placed upon the electrical cable.

2. The electrical cable of claim 1, wherein the sheath is non-conductive.

3. The electrical cable of claim 1, wherein the sheath is configured to not kink when the electrical cable is bent.

4. The electrical cable of claim 1, wherein the sheath is made of a material that is more easily removed that if the sheath were made of stainless steal.

5. The electrical cable of claim 1, wherein the sheath is made of fiberglass.

6. The electrical cable of claim 1, wherein the sheath is configured to not kink when the sheath is bent.

7. The electrical cable of claim 1, wherein the optical fiber is configured to be used for communications and temperature sensing of the conductor.

8. The electrical cable of claim 1, wherein the optical fiber is configured to be used for communications.

9. The electrical cable of claim 1, wherein the optical fiber is configured to be used for temperature sensing of the conductor.

10. The electrical cable of claim 1, wherein the fiber optic member comprises a plurality of optical fibers that include the optical fiber.

11. The electrical cable of claim 10, wherein the optical fiber is configured to be used for communications and a one of the remaining plurality of optical fibers is configured to be used for temperature sensing of the conductor.

12. The electrical cable of claim 1, further comprising a conductor shield placed around the conductor.

13. The electrical cable of claim 12, further comprising insulation around the conductor shield.

14. The electrical cable of claim 13, further comprising an insulation shield around the insulation.

15. The electrical cable of claim 14, wherein the concentric neutral is placed around the insulation shield.

16. An electrical cable comprising:
a conductor;
a conductor shield placed around the conductor;
an insulation placed around the conductor shield;
an insulation shield placed around the insulation;
a concentric neutral placed around the insulation shield, the concentric neutral comprising a plurality of electrically conductive strands, each of the plurality of electrically conductive strands being substantially evenly spaced around the insulation shield;
a jacket placed around the concentric neutral; and
a fiber optic member place between two of the plurality of electrically conductive strands wherein the two of the plurality of electrically conductive strands each have a diameter greater than a diameter of the fiber optic member, the fiber optic member comprising,
an optical fiber, and
a sheath surrounding the optical fiber, the sheath being configured to not damage the optical fiber when the electrical cable is bent wherein the sheath is non-conductive wherein the optical fiber is configured to be used for temperature sensing of the conductor.

17. An electrical cable comprising:
a conductor;
a fiber optic member;
a concentric neutral comprising a plurality of electrically conductive strands each of the plurality of electrically conductive strands being substantially evenly placed concentrically around the conductor, the fiber optic member being place between two of the plurality of electrically conductive strands wherein the two of the plurality of electrically conductive strands each have a diameter greater than a diameter of the fiber optic member; and
a jacket around the concentric neutral defining a space between the jacket and the two of the plurality of electrically conductive strands configured to protect fiber optic member from physical stresses placed upon the electrical cable.

* * * * *